United States Patent
Kim et al.

(10) Patent No.: US 12,550,634 B2
(45) Date of Patent: Feb. 10, 2026

(54) SELF-HEALING MEMORY DEVICE AND METHOD OF MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Tae Whan Kim, Seoul (KR); Young Jin Kim, Seoul (KR); Hao Qun An, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 679 days.

(21) Appl. No.: 17/893,251

(22) Filed: Aug. 23, 2022

(65) Prior Publication Data

US 2023/0072894 A1 Mar. 9, 2023

(30) Foreign Application Priority Data

Sep. 8, 2021 (KR) .................. 10-2021-0119747

(51) Int. Cl.
*H10N 70/00* (2023.01)
*H10B 20/20* (2023.01)
*H10B 63/00* (2023.01)

(52) U.S. Cl.
CPC .......... *H10N 70/8845* (2023.02); *H10B 20/20* (2023.02); *H10B 63/80* (2023.02); *H10N 70/021* (2023.02); *H10N 70/841* (2023.02)

(58) Field of Classification Search
CPC ............ H10N 70/8845; G11C 2213/16; G11C 2213/35; G11C 13/0016
See application file for complete search history.

(56) References Cited

U.S. PATENT DOCUMENTS

| | | | | |
|---|---|---|---|---|
| 2005/0058009 | A1* | 3/2005 | Yang ...................... | B82Y 10/00 365/232 |
| 2008/0054254 | A1* | 3/2008 | Sydorenko .......... | G11C 13/0014 257/40 |
| 2020/0216581 | A1* | 7/2020 | Suh .......................... | G02B 1/04 |

FOREIGN PATENT DOCUMENTS

| KR | 10-2009-0043726 A | 5/2009 |
|---|---|---|
| KR | 10-1544325 B1 | 8/2015 |

(Continued)

OTHER PUBLICATIONS

Sung et al., "Biosynaptic devices based on chicken egg albumen: graphene quantum dot nanocomposites," Scientific Reports, 2020, vol. 10, No. 1255, pp. 1-8 (8 pages).

(Continued)

*Primary Examiner* — Shih Tsun A Chou
(74) *Attorney, Agent, or Firm* — Sughrue Mion, PLLC

(57) ABSTRACT

Disclosed are a self-healing memory device including a lower electrode; a polymer nanocomposite layer formed on the lower electrode, wherein, when a structural defect occurs, the polymer nanocomposite layer repairs the structural defect and restores a memory function damaged due to the structural defect through a self-healing mechanism characterized by movement of a polymer material and hydrogen bonding; and an upper electrode formed on the polymer nanocomposite layer and a method of manufacturing the self-healing memory device.

16 Claims, 5 Drawing Sheets

(56) References Cited

FOREIGN PATENT DOCUMENTS

KR    10-1823231 B1   1/2018
KR    10-2018-0097969 A   9/2018

OTHER PUBLICATIONS

Korean Office Action issued May 22, 2023 in Application No. 10-2021-0119747.

* cited by examiner

[FIG. 1]
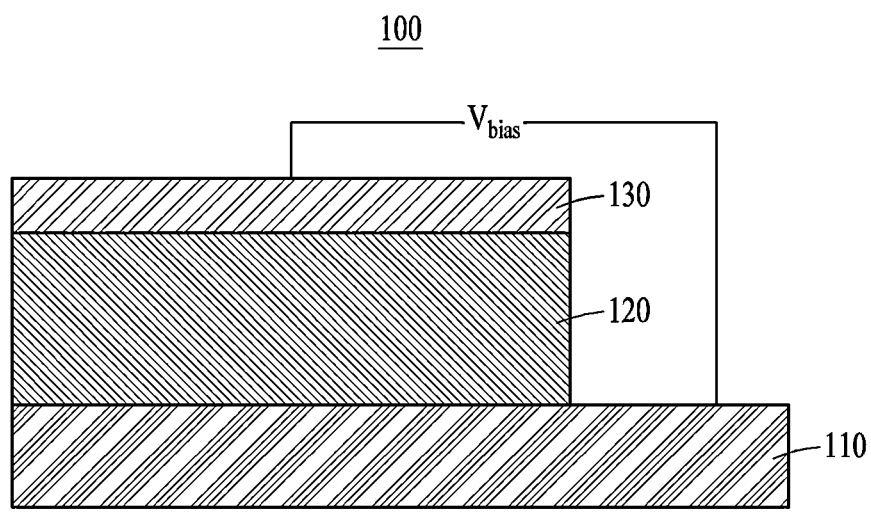
[FIG. 2A]
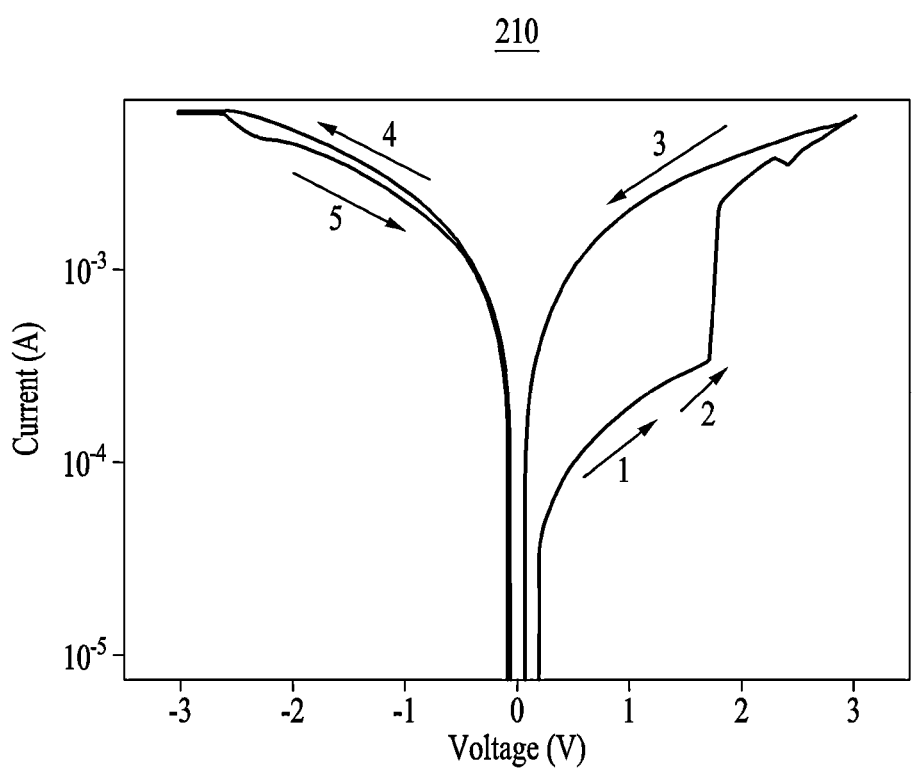

[FIG. 2B]
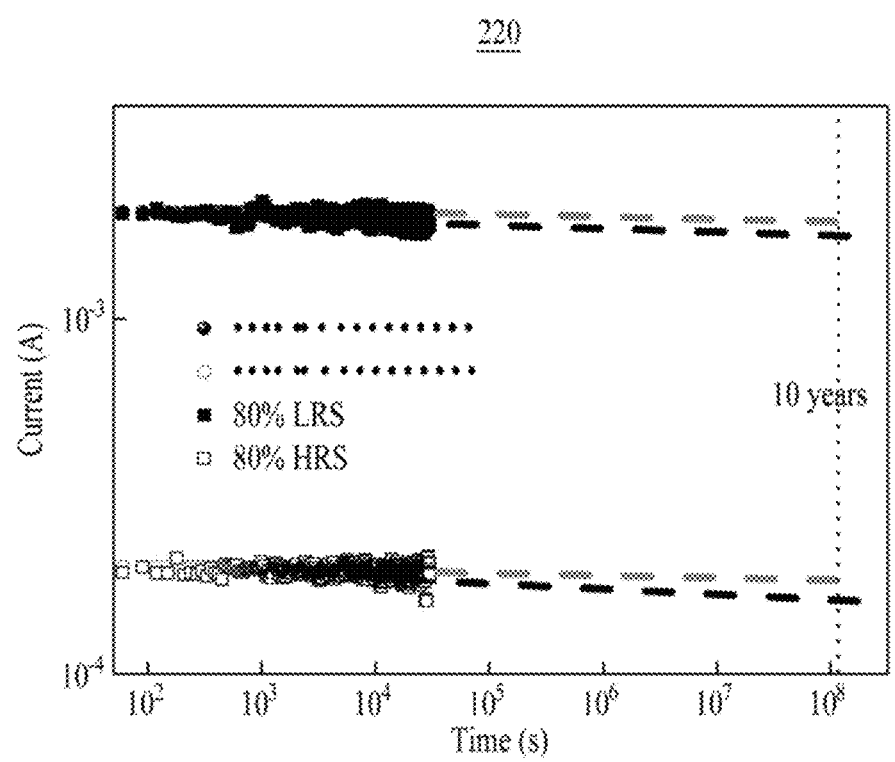

[FIG. 3]
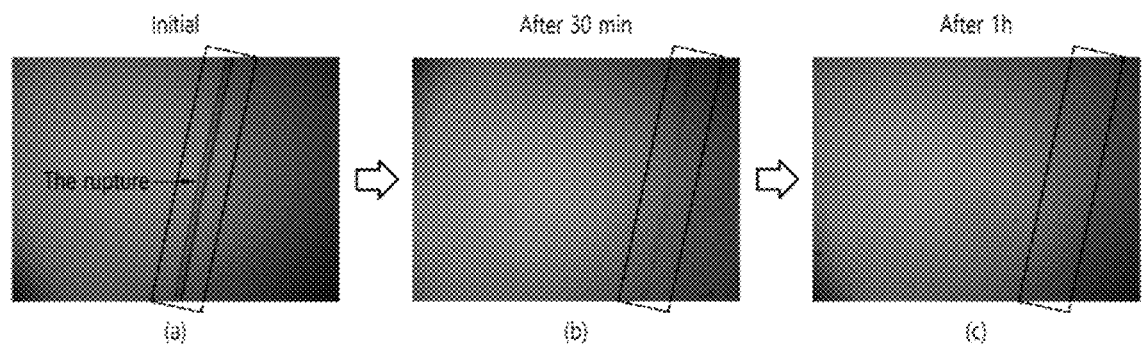
[FIG. 4]
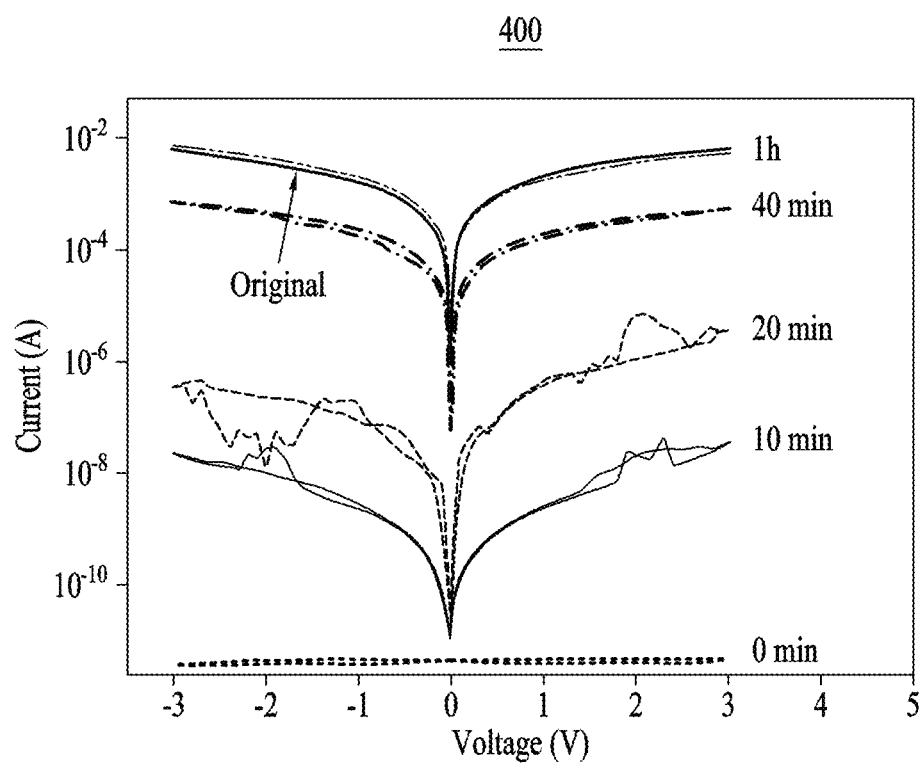

[FIG. 5]
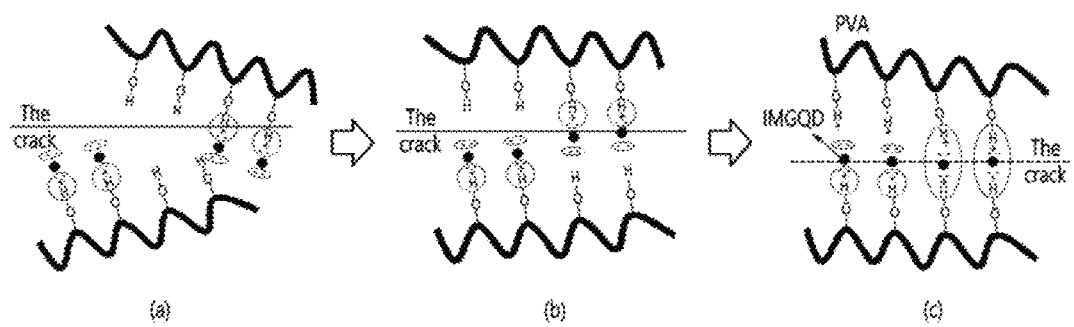
[FIG. 6]
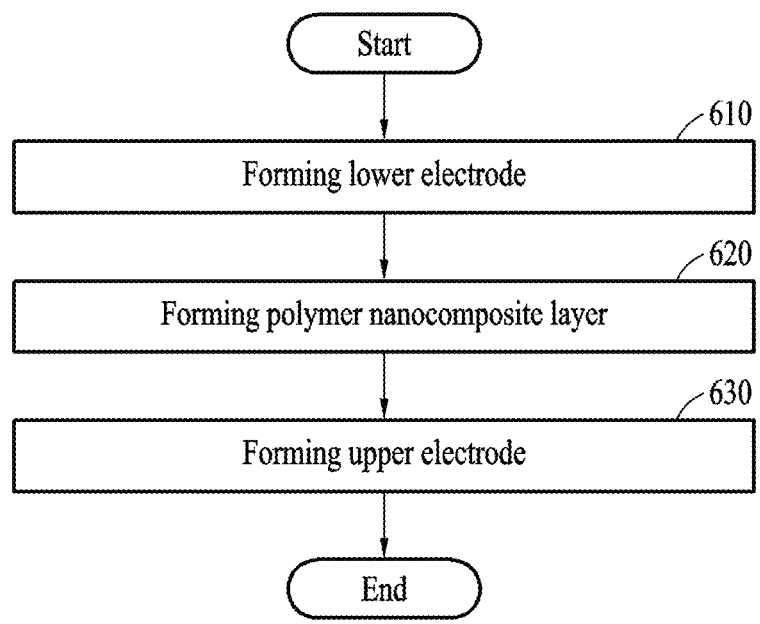

【FIG. 7】
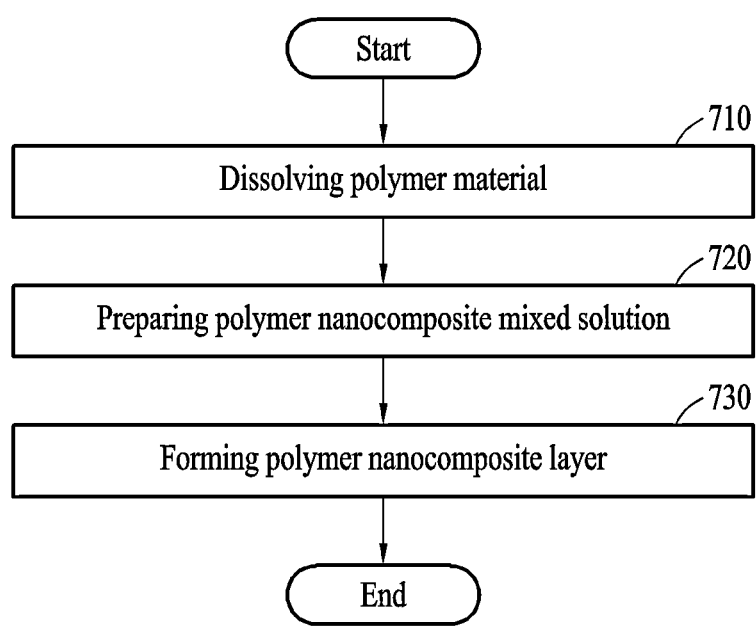

SELF-HEALING MEMORY DEVICE AND METHOD OF MANUFACTURING THE SAME

CROSS-REFERENCE TO RELATED APPLICATION

This application claims priority to Korean Patent Application No. 10-2021-0119747, filed on Sep. 8, 2021, in the Korean Intellectual Property Office, the disclosure of which is incorporated herein by reference.

BACKGROUND OF THE DISCLOSURE

Field of the Disclosure

The present disclosure relates to a self-healing memory device and a method of manufacturing the same, and more particularly, to a technical idea of repairing a structural defect through a self-healing mechanism in a memory device.

This patent was supported by the National Research Foundation of Korea, which is funded by the Korean government (Ministry of Science and ICT), and the national R&D tasks related to this patent are as follows.

Title of research project: Research and application of intelligent neuromorphic device and human-friendly light-emitting device
  Research project identification number: 202100000000484
  Grant number (government): 2019R1A2B5B03069968
  Research project department: Ministry of Science and ICT (2017Y)
  Title of research program: Basic research project in science and engineering fields/Support project for middle-level researchers/Follow-up research for middle-level researchers (average annual research funds: 200 million to 400 million won)
  Lead agency and specialized institute of research management: National Research Foundation of Korea
  Project period: Mar. 1, 2021~Feb. 28, 2022

Description of the Related Art

The currently commercialized write-once-read-many times (WORM) memory is a low-cost memory characterized in that once information is written, data values cannot be changed any more. Due to these characteristics, the memory is very useful as a memory for semi-permanently storing important large-capacity data.

That is, since the WORM memory cannot be erased electrically or optically, when exposed to an external environment, the WORM memory is very useful compared to a flash memory or a hard disk. Accordingly, the WORM memory may be applied to a flexible/wearable device and used to store main information.

As interest in health care increases, flexible/wearable devices that can be attached to the human body are receiving much attention in the fields of medicine and healthcare. These flexible/wearable devices are repeatedly folded or stretched by movement of the human body. Also, the devices may often be mechanically damaged by external impact.

Such damage may affect the electrical characteristics of the device and even destroy the device completely. Accordingly, to improve the durability and usability of the flexible/wearable device, a method capable of solving the above-described problems is required.

RELATED ART DOCUMENTS

Patent Documents

Korean Patent No. 10-1544325, "SELF-HEALING ENERGY GENERATION DEVICE USING SHAPE MEMORY POLYMER"
Korean Patent No. 10-1823231, "SUPRAMOLECULAR COMPLEX NETWORK HAVING SELF-HEALING PROPERTIES AND METHOD FOR MANUFACTURING THE SAME"

SUMMARY OF THE DISCLOSURE

Therefore, the present disclosure has been made in view of the above problems, and it is an object of the present disclosure to provide a self-healing memory device capable of restoring the intrinsic properties thereof due to the self-healing characteristics thereof even when the device is damaged or destroyed due to a factor such as movement or external impact and a method of manufacturing the self-healing memory device.

It is another object of the present disclosure to provide a self-healing memory device capable of improving durability and usability due to the self-healing characteristics thereof when applied to wearable devices and a method of manufacturing the self-healing memory device.

It is yet another object of the present disclosure to provide a self-healing memory device capable of storing information input by a charge transport mechanism and a method of manufacturing the self-healing memory device.

In accordance with one aspect of the present disclosure, provided is a self-healing memory device including a lower electrode; a polymer nanocomposite layer formed on the lower electrode, wherein, when a structural defect occurs, the polymer nanocomposite layer repairs the structural defect and restores a memory function damaged due to the structural defect through a self-healing mechanism characterized by movement of a polymer material and hydrogen bonding; and an upper electrode formed on the polymer nanocomposite layer.

According to one aspect, the polymer nanocomposite layer may include a nanocarbon material that induces self-healing through hydrogen bonding with the polymer material having a functional group capable of hydrogen bonding.

According to one aspect, the nanocarbon material may include at least one of single-walled carbon nanotubes, double-walled carbon nanotubes, multi-walled carbon nanotubes, fullerenes, carbon nanofibers, graphene, and graphene quantum dots.

According to one aspect, a surface of the nanocarbon material may be functionalized with a material including at least one substance of nitrogen (N)-based substances, fluorine (F)-based substances, sulfur (S)-based substances, oxygen (O)-based substances, bromine (Br)-based substances, and chlorine (Cl)-based substances.

According to one aspect, the polymer nanocomposite layer may act as a resistance change layer based on resistance difference by a charge transport mechanism according to voltages applied through the lower and upper electrodes.

According to one aspect, the nanocarbon material may trap electric charge according to voltages applied through the lower and upper electrodes, and a resistance of the nanocarbon material may change according to an amount of the trapped electric charge.

According to one aspect, the polymer material may include at least one hydrophilic polymer-based material of polyvinyls, polyacryls, polyamines, polyurethanes, polysaccharides, and proteins.

According to one aspect, the structural defect may include at least one of a point defect, a line defect, and a surface defect due to cracks or tears inside or outside the polymer nanocomposite layer.

According to one aspect, at least one of the lower and upper electrodes may include at least one of gold (Au), silver (Ag), copper (Cu), aluminum (Al), magnesium (Mg), tungsten (W), zinc (Zn), molybdenum (Mo), iron (Fe), platinum (Pt), palladium (Pd), and ITO.

According to one aspect, the upper electrode may be formed to cross the lower electrode at right angles to form a crossbar array.

According to one aspect, the lower electrode may be formed on at least one of a $P^+$-doped silicon (Si) substrate, a polyimide substrate, a polydimethylsiloxane (PDMS) substrate, a polyethylene terephthalate (PET) substrate, a glass substrate, and a rice paper substrate.

In accordance with another aspect of the present disclosure, provided is a method of manufacturing a self-healing memory device, the method including forming a lower electrode on a substrate; forming a polymer nanocomposite layer on the lower electrode; and forming an upper electrode on the polymer nanocomposite layer, wherein, when a structural defect occurs, the polymer nanocomposite layer repairs the structural defect through a self-healing mechanism characterized by movement of a polymer material and hydrogen bonding.

According to one aspect, the forming of the polymer nanocomposite layer may include dissolving a polymer material in a solvent; preparing a polymer nanocomposite mixed solution by dispersing a functionalized nanocarbon material on the dissolved polymer material; and forming the polymer nanocomposite layer by depositing the prepared mixed solution on the lower electrode and evaporating a solvent of the polymer material.

According to one aspect, the solvent of the polymer material may include at least one of methanol, ethanol, isopropyl alcohol, acetone, and acetic acid.

According to one aspect, in the preparing of the mixed solution, the functionalized nanocarbon material may be formed by functionalizing a nanocarbon material with a material including at least one substance of nitrogen (N)-based substances, fluorine (F)-based substances, sulfur (S)-based substances, oxygen (O)-based substances, bromine (Br)-based substances, and chlorine (Cl)-based substances.

According to one aspect, in the forming of the polymer nanocomposite layer, the prepared mixed solution may be deposited on the lower electrode using at least one of spin coating, spray coating, bar coating, dip-coating, curtain coating, slot coating, roll coating, and gravure coating.

According to one aspect, at least one of the lower and upper electrodes may be formed using at least one of sputtering, atomic layer deposition (ALD), thermal evaporation, pulsed laser deposition (PLD), electron beam evaporation, physical vapor deposition (PVD), and chemical vapor deposition (CVD).

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a self-healing memory device according to one embodiment;

FIGS. 2A and 2B are graphs showing the memory function of a self-healing memory device according to one embodiment;

FIG. 3 includes images showing an example of repairing a structural defect through a self-healing mechanism in a self-healing memory device according to one embodiment;

FIG. 4 is a graph for explaining an example of restoring a memory function through a self-healing mechanism in a self-healing memory device according to one embodiment;

FIG. 5 includes drawings for explaining in more detail a self-healing mechanism performed by a self-healing memory device according to one embodiment;

FIG. 6 is a flowchart for explaining a method of manufacturing a self-healing memory device according to one embodiment; and FIG. 7 is a flowchart for explaining in more detail a method of manufacturing a self-healing memory device according to one embodiment.

DETAILED DESCRIPTION OF THE DISCLOSURE

Hereinafter, preferred embodiments of the present disclosure will be described in detail with reference to the accompanying drawings.

However, it should be understood that the present disclosure is not limited to the embodiments according to the concept of the present disclosure, but includes changes, equivalents, or alternatives falling within the spirit and scope of the present disclosure.

In the following description of the present disclosure, detailed description of known functions and configurations incorporated herein will be omitted when it may make the subject matter of the present disclosure unclear.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do ~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless mentioned otherwise or clearly inferred from context, the expression "x uses a or b" means any one of natural inclusive permutations.

In the above-described specific embodiments, elements included in the invention are expressed in singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

FIG. 1 illustrates a self-healing memory device according to one embodiment.

Referring to FIG. 1, a self-healing memory device 100 according to one embodiment may restore the intrinsic properties thereof due to the self-healing characteristics thereof even when the self-healing memory device 100 is damaged or destroyed due to a factor such as movement or external impact.

In addition, the self-healing memory device 100 may be applied to a wearable device, and the durability and usability of the device may be improved due to the self-healing characteristics of the self-healing memory device 100.

In addition, the self-healing memory device 100 may store information input by a charge transport mechanism.

To implement these functions, the self-healing memory device 100 may include a lower electrode 110, a polymer nanocomposite layer 120 formed on the lower electrode 110, and an upper electrode 130 formed on the polymer nanocomposite layer 120.

That is, the self-healing memory device 100 may be implemented as a two-terminal structure in which the polymer nanocomposite layer 120 for performing a memory function is inserted between the lower and upper electrodes 110 and 130. Preferably, the self-healing memory device 100 is an electronic synaptic device.

For example, at least one of the lower and upper electrodes 110 and 130 may include at least one of gold (Au), silver (Ag), copper (Cu), aluminum (Al), magnesium (Mg), tungsten (W), zinc (Zn), molybdenum (Mo), iron (Fe), platinum (Pt), palladium (Pd), and ITO.

According to one aspect, the lower electrode 110 may be formed on at least one of a $P^+$-doped silicon (Si) substrate, a polyimide substrate, a polydimethylsiloxane (PDMS) substrate, a polyethylene terephthalate (PET) substrate, a glass substrate, and a rice paper substrate.

In addition, the upper electrode 130 may be formed to cross the lower electrode at right angles to form a crossbar array. For example, the upper electrode 130 may be implemented as a plurality of electrodes, and the upper electrodes 130 may be formed a crossbar array with the lower electrode 110.

In addition, when a structural defect occurs, the polymer nanocomposite layer 120 according to one embodiment may repair the structural defect and restore a memory function damaged due to the structural defect through a self-healing mechanism characterized by movement of a polymer material and hydrogen bonding.

For example, the structural defect may include at least one of a point defect, a line defect, and a surface defect due to cracks or tears inside or outside the polymer nanocomposite layer 120.

Specifically, the polymer nanocomposite layer 120 may include a nanocarbon material that induces self-healing through hydrogen bonding with the polymer material having a functional group capable of hydrogen bonding.

For example, the nanocarbon material may include at least one of single-walled carbon nanotubes, double-walled carbon nanotubes, multi-walled carbon nanotubes, fullerenes, carbon nanofibers, graphene, and graphene quantum dots.

In addition, the polymer material may include at least one hydrophilic polymer-based material of polyvinyls, polyacryls, polyamines, polyurethanes, polysaccharides, and proteins.

Preferably, the polymer nanocomposite layer 120 is formed by mixing a polyvinyl as the polymer material and graphene quantum dots as the nanocarbon material.

According to one aspect, to implement self-healing through hydrogen bonding with a hydrophilic polymer-based material (i.e., polymer material), the surface of the nanocarbon material may be functionalized with a material including at least one substance of nitrogen (N)-based substances, fluorine (F)-based substances, sulfur (S)-based substances, oxygen (O)-based substances, bromine (Br)-based substances, and chlorine (Cl)-based substances. That is, in the polymer nanocomposite layer 120, the functionalized nanocarbon material may be hydrogen-bonded with the polymer material.

Specifically, when a structural defect occurs, in the polymer nanocomposite layer 120, hydrogen bond between the functionalized nanocarbon material and the polymer material may be broken due to the structural defect. However, after a certain period of time has elapsed, due to self-healing characteristics, hydrogen bonding between the functionalized nanocarbon material and the polymer material is restored at a portion where the structural defect occurs, thereby repairing the structural defect and restoring a memory function damaged due to the structural defect.

More specifically, under conditions that cause movement of the chains of the polymer material, in the polymer nanocomposite layer 120, at a portion where a structural defect occurs, the functionalized nanocarbon material and the polymer material may be recombined, specifically, hydrogen bond between the functionalized nanocarbon material and the polymer material may be restored, thereby repairing the structural defect and restoring a memory function damaged due to the structural defect. For example, when the glass transition temperature of the polymer is applied to the polymer nanocomposite layer 120, movement of the chains may be induced.

According to one aspect, the polymer nanocomposite layer 120 may be act as a resistance change layer based on resistance difference by a charge transport mechanism according to voltages applied through the lower and upper electrodes 110 and 130.

For example, the nanocarbon material may trap electric charge according to voltages applied through the lower and upper electrodes 110 and 130, and the resistance of the nanocarbon material may be changed according to the amount of the trapped electric charge.

Specifically, in the self-healing memory device 100 as a WORM memory device, the nanocarbon material may trap electric charge according to voltages applied through the lower and upper electrodes 110 and 130. According to the amount of the trapped electric charge, the resistance state of the polymer nanocomposite layer 120 may change from a high resistance state (HRS) to a low resistance state (LRS) (i.e., record status).

Since the nanocarbon material is surrounded by the polymer material, electric charge is strongly trapped and is not easily released to the outside. For this reason, even when a voltage is applied in a direction opposite to the direction of a voltage applied during write operation, the record is not easily erased, which enables semi-permanent preservation of data.

FIGS. 2A and 2B are graphs showing the memory function of a self-healing memory device according to one embodiment.

Referring to FIGS. 2A and 2B, reference numeral 210 shows the electrical characteristics of the self-healing memory device according to one embodiment, and reference numeral 220 shows the data preservation characteristics of the self-healing memory device according to one embodiment.

According to reference numeral 210, in the self-healing memory device according to one embodiment, a polymer nanocomposite layer may be formed between a lower electrode and an upper electrode, and the polymer nanocomposite layer may act as a resistance change layer based on resistance difference by a charge transport mechanism according to voltages applied through the lower and upper electrodes.

Specifically, at "1" and "2" sections of reference numeral 210, the amount of current flowing through the self-healing memory device rapidly increases, which means that a resistance state changes from a high resistance state (HRS) to a low resistance state (LRS), that is, that write operation occurs.

Next, in the self-healing memory device, at "3" to "5" sections of reference numeral 210, a low resistance state (LRS) is maintained. That is, in the self-healing memory device, written data does not change even when applied voltage changes.

According to reference numeral 220, the self-healing memory device exhibits stable data preservation characteristics under high temperature (80° C.) and high humidity (80% humidity) conditions. In addition, as a result of analysis based on the obtained data, the self-healing memory device may preserve data for 10 years.

That is, the self-healing memory device may exhibit excellent data preservation characteristics even under very severe conditions based on the principle that electric charge trapped due to write operation is strongly trapped in the nanocarbon material.

FIG. 3 includes images showing an example of repairing a structural defect through a self-healing mechanism in a self-healing memory device according to one embodiment.

Referring to FIG. 3, (a) to (c) of FIG. 3 are light microscope images showing the self-healing characteristics of the polymer nanocomposite layer of the self-healing memory device according to one embodiment.

As shown in (a) to (c) of FIG. 3, when a rupture, i.e., a structural defect, occurs in the polymer nanocomposite layer, at the beginning of occurrence of the defect, the defect is clearly observed. However, one hour after occurrence of the structural defect, it can be confirmed that the structural defect is completely repaired.

FIG. 4 is a graph for explaining an example of restoring a memory function through a self-healing mechanism in a self-healing memory device according to one embodiment.

Referring to FIG. 4, reference numeral 400 shows electrical characteristics according to occurrence of a structural defect and self-healing in the polymer nanocomposite layer of the self-healing memory device according to one embodiment.

As shown in reference numeral 400, in the polymer nanocomposite layer, when a structural defect occurs, the recorded electrical characteristics are damaged. However, when self-healing is completed (after 1 hour from the time of occurrence of the structural defect), the intrinsic electrical properties are completely restored.

That is, the polymer nanocomposite layer according to one embodiment may restore a memory function damaged due to a structural defect through a self-healing mechanism.

FIG. 5 includes drawings for explaining in more detail a self-healing mechanism performed by a self-healing memory device according to one embodiment.

Referring to FIG. 5, (a) to (c) of FIG. 5 show an example of repairing a structural defect through a self-healing mechanism in the polymer nanocomposite layer of the self-healing memory device according to one embodiment.

As shown in (a) to (c) of FIG. 5, the polymer nanocomposite layer may include a nanocarbon material (e.g., IMGQD) that induces self-healing through hydrogen bonding with a polymer material (e.g., PVA) having a functional group capable of hydrogen bonding. In this case, the surface of the nanocarbon material may be functionalized with a material including at least one substance of nitrogen (N)-based substances, fluorine (F)-based substances, sulfur (S)-based substances, oxygen (O)-based substances, bromine (Br)-based substances, and chlorine (Cl)-based substances.

Specifically, as shown in (a) of FIG. 5, in the polymer nanocomposite layer 120, when a structural defect (crack) occurs, hydrogen bond between the functionalized nanocarbon material and the polymer material may be broken due to the structural defect. However, as shown in (b) and (c) of FIG. 5, after a certain period of time has elapsed, due to self-healing characteristics, hydrogen bonding between the functionalized nanocarbon material and the polymer material is restored, thereby repairing the structural defect and restoring a memory function damaged due to the structural defect.

FIG. 6 is a flowchart for explaining a method of manufacturing a self-healing memory device according to one embodiment.

That is, FIG. 6 shows a flowchart for explaining the method of manufacturing the self-healing memory device according to one embodiment described with reference to FIGS. 1 to 5. Hereinafter, the method of the present disclosure will be described with reference to FIG. 6, and the repeated description already mentioned in FIGS. 1 to 5 will be omitted.

Referring to FIG. 6, in step 610 of the method of manufacturing a self-healing memory device according to one embodiment, a lower electrode may be formed on a substrate.

For example, the substrate may include at least one of a Pt-doped silicon (Si) substrate, a polyimide substrate, a polydimethylsiloxane (PDMS) substrate, a polyethylene terephthalate (PET) substrate, a glass substrate, and a rice paper substrate.

Next, in step 620 of the method of manufacturing a self-healing memory device according to one embodiment, a polymer nanocomposite layer may be formed on the lower electrode.

In this case, when a structural defect occurs, the polymer nanocomposite layer may repair the structural defect through a self-healing mechanism characterized by movement of a polymer material and hydrogen bonding.

According to one aspect, in step 620 of the method of manufacturing a self-healing memory device according to one embodiment, the polymer nanocomposite layer including a nanocarbon material that induces self-healing through hydrogen bonding with the polymer material having a functional group capable of hydrogen bonding may be formed.

For example, the nanocarbon material may include at least one of single-walled carbon nanotubes, double-walled carbon nanotubes, multi-walled carbon nanotubes, fullerenes, carbon nanofibers, graphene, and graphene quantum dots.

In addition, the polymer material may include at least one hydrophilic polymer-based material of polyvinyls, polyacryls, polyamines, polyurethanes, polysaccharides, and proteins.

According to one aspect, the surface of the nanocarbon material may be functionalized with a material including at least one substance of nitrogen (N)-based substances, fluorine (F)-based substances, sulfur (S)-based substances, oxygen (O)-based substances, bromine (Br)-based substances, and chlorine (Cl)-based substances.

The method of manufacturing a polymer nanocomposite layer according to one embodiment will be described in more detail with reference to FIG. 7.

Next, in step 630 of the method of manufacturing a self-healing memory device according to one embodiment, an upper electrode may be formed on the polymer nanocomposite layer.

According to one aspect, the lower electrode and/or the upper electrode may include at least one of gold (Au), silver (Ag), copper (Cu), aluminum (Al), magnesium (Mg), tungsten (W), zinc (Zn), molybdenum (Mo), iron (Fe), platinum (Pt), palladium (Pd), and ITO.

In addition, the lower electrode and/or the upper electrode may be formed using at least one of sputtering, atomic layer deposition (ALD), thermal evaporation, pulsed laser deposition (PLD), electron beam evaporation, physical vapor deposition (PVD), and chemical vapor deposition (CVD).

Preferably, in step 630 of the method of manufacturing a self-healing memory device according to one embodiment, an upper electrode made of aluminum may be formed to have a thickness of about 200 nm using thermal evaporation.

FIG. 7 is a flowchart for explaining in more detail a method of manufacturing a self-healing memory device according to one embodiment.

The method of manufacturing a self-healing memory device according to one embodiment described with reference to FIG. 7 may be performed in step 620 of FIG. 6.

Referring to FIG. 7, in step 710 of the method of manufacturing a self-healing memory device according to one embodiment, a polymer material may be dissolved in a solvent.

For example, the solvent used to dissolve the polymer material may include at least one of methanol, ethanol, isopropyl alcohol, acetone, and acetic acid.

Next, in step 720 of the method of manufacturing a self-healing memory device according to one embodiment, a polymer nanocomposite mixed solution may be prepared by dispersing a functionalized nanocarbon material on the dissolved polymer material.

According to one aspect, in step 720 of the method of manufacturing a self-healing memory device according to one embodiment, the surface of the nanocarbon material may be functionalized with a material including at least one substance of nitrogen (N)-based substances, fluorine (F)-based substances, sulfur (S)-based substances, oxygen (O)-based substances, bromine (Br)-based substances, and chlorine (Cl)-based substances.

Preferably, in step 720 of the method of manufacturing a self-healing memory device according to one embodiment, the mixed solution may be prepared by dissolving the polymer material (e.g., polyvinyl alcohol (PVA)) and the functionalized nanocarbon material (e.g., imidazole-modified graphene quantum dots (IMGQDs)) in distilled water and mixing the polymer material and the functionalized nanocarbon material at 90° C.

Next, in step 730 of the method of manufacturing a self-healing memory device according to one embodiment, a polymer nanocomposite layer may be formed by depositing the prepared mixed solution on the lower electrode and evaporating the solvent of the polymer material.

According to one aspect, in step 730 of the method of manufacturing a self-healing memory device according to one embodiment, the prepared mixed solution may be deposited on the lower electrode using at least one of spin coating, spray coating, bar coating, dip-coating, curtain coating, slot coating, roll coating, and gravure coating.

Preferably, in step 730 of the method of manufacturing a self-healing memory device according to one embodiment, a glass substrate on which an ITO electrode (lower electrode) is formed may be cleaned by ultrasonication for 30 minutes each in the order of acetone, methanol, and distilled water. Then, the prepared mixed solution may be dropped on the cleaned ITO electrode and spin coating may be performed to form the polymer nanocomposite layer.

In addition, in step 730 of the method of manufacturing a self-healing memory device according to one embodiment, the glass substrate on which the polymer nanocomposite layer is formed may be heat-treated at 80° C. to remove the solvent remaining on the polymer nanocomposite layer.

In summary, when the present disclosure is used, even when damage or destruction occurs due to a factor such as movement or external impact, intrinsic properties may be restored due to self-healing characteristics.

In addition, when the device of the present disclosure is applied to a wearable device, the durability and usability of the wearable device may be improved due to the self-healing characteristics of the device of the present disclosure.

In addition, when the present disclosure is used, a self-healing memory device capable of storing information input by an electric charge transport mechanism may be provided.

According to one embodiment, a self-healing memory device of the present disclosure can restore the intrinsic properties thereof due to the self-healing characteristics thereof even when damaged or destroyed due to a factor such as movement or external impact.

According to one embodiment, the self-healing memory device of the present disclosure can be applied to a wearable device, and the durability and usability of the wearable device can be improved due to the self-healing characteristics of the self-healing memory device.

According to one embodiment, the self-healing memory device of the present disclosure can store information input by a charge transport mechanism.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

100: SELF-HEALING MEMORY DEVICE
110: LOWER ELECTRODE
120: POLYMER NANOCOMPOSITE LAYER
130: UPPER ELECTRODE

What is claimed is:

1. A self-healing memory device, comprising:
a lower electrode;
a polymer nanocomposite layer formed on the lower electrode, wherein, when a structural defect occurs, the polymer nanocomposite layer repairs the structural defect and restores a memory function damaged due to the structural defect through a self-healing mechanism characterized by movement of a polymer material and hydrogen bonding; and
an upper electrode formed on the polymer nanocomposite layer,
wherein the polymer material comprises at least one hydrophilic polymer-based material of polyvinyls, polyacryls, polyamines, polyurethanes, polysaccharides, and proteins.

2. The self-healing memory device according to claim 1, wherein the polymer nanocomposite layer comprises a nanocarbon material that induces self-healing through hydrogen bonding with the polymer material having a functional group capable of hydrogen bonding.

3. The self-healing memory device according to claim 2, wherein the nanocarbon material comprises at least one of single-walled carbon nanotubes, double-walled carbon nanotubes, multi-walled carbon nanotubes, fullerenes, carbon nanofibers, graphene, and graphene quantum dots.

4. The self-healing memory device according to claim 2, wherein a surface of the nanocarbon material is functionalized with a material comprising at least one substance of nitrogen (N)-based substances, fluorine (F)-based substances, sulfur(S)-based substances, oxygen (O)-based substances, bromine (Br)-based substances, and chlorine (Cl)-based substances.

5. The self-healing memory device according to claim 2, wherein the polymer nanocomposite layer acts as a resistance change layer based on resistance difference by a charge transport mechanism according to voltages applied through the lower and upper electrodes.

6. The self-healing memory device according to claim 5, wherein the nanocarbon material traps electric charge according to voltages applied through the lower and upper electrodes, and a resistance of the nanocarbon material changes according to an amount of the trapped electric charge.

7. The self-healing memory device according to claim 1, wherein the structural defect comprises at least one of a point defect, a line defect, and a surface defect due to cracks or tears inside or outside the polymer nanocomposite layer.

8. The self-healing memory device according to claim 1, wherein at least one of the lower and upper electrodes comprises at least one of gold (Au), silver (Ag), copper (Cu), aluminum (Al), magnesium (Mg), tungsten (W), zinc (Zn), molybdenum (Mo), iron (Fe), platinum (Pt), palladium (Pd), and ITO.

9. The self-healing memory device according to claim 1, wherein the upper electrode is formed to cross the lower electrode at right angles to form a crossbar array.

10. The self-healing memory device according to claim 1, wherein the lower electrode is formed on at least one of a $P^+$-doped silicon (Si) substrate, a polyimide substrate, a polydimethylsiloxane (PDMS) substrate, a polyethylene terephthalate (PET) substrate, a glass substrate, and a rice paper substrate.

11. A method of manufacturing a self-healing memory device, comprising:
forming a lower electrode on a substrate;
forming a polymer nanocomposite layer on the lower electrode; and
forming an upper electrode on the polymer nanocomposite layer,
wherein, when a structural defect occurs, the polymer nanocomposite layer repairs the structural defect through a self-healing mechanism characterized by movement of a polymer material and hydrogen bonding,
wherein the polymer material comprises at least one hydrophilic polymer-based material of polyvinyls, polyacryls, polyamines, polyurethanes, polysaccharides, and proteins.

12. The method according to claim 11, wherein the forming of the polymer nanocomposite layer comprises dissolving the polymer material in a solvent;
preparing a polymer nanocomposite mixed solution by dispersing a functionalized nanocarbon material on the dissolved polymer material; and
forming the polymer nanocomposite layer by depositing the prepared mixed solution on the lower electrode and evaporating a solvent of the polymer material.

13. The method according to claim 12, wherein the solvent of the polymer material comprises at least one of methanol, ethanol, isopropyl alcohol, acetone, and acetic acid.

14. The method according to claim 12, wherein, in the preparing of the mixed solution, the functionalized nanocarbon material is formed by functionalizing a nanocarbon material with a material comprising at least one substance of nitrogen (N)-based substances, fluorine (F)-based substances, sulfur(S)-based substances, oxygen (O)-based substances, bromine (Br)-based substances, and chlorine (Cl)-based substances.

15. The method according to claim 12, wherein, in the forming of the polymer nanocomposite layer, the prepared mixed solution is deposited on the lower electrode using at least one of spin coating, spray coating, bar coating, dip-coating, curtain coating, slot coating, roll coating, and gravure coating.

16. The method according to claim 11, wherein at least one of the lower and upper electrodes is formed using at least one of sputtering, atomic layer deposition (ALD), thermal evaporation, pulsed laser deposition (PLD), electron beam evaporation, physical vapor deposition (PVD), and chemical vapor deposition (CVD).

* * * * *